John M. Rosebrook
Chain and Rake Attachment for Reaping Machines.

117687

PATENTED AUG 1 1871

Witnesses.
Jno. D. Patten
Edmund Masson

Inventor.
John M. Rosebrook.
By atty. A. B. Stoughton.

UNITED STATES PATENT OFFICE.

JOHN M. ROSEBROOK, OF HOOSICK FALLS, NEW YORK.

IMPROVEMENT IN HARVESTER-RAKES.

Specification forming part of Letters Patent No. 117,687, dated August 1, 1871.

*To all whom it may concern:*

Be it known that I, JOHN M. ROSEBROOK, of Hoosick Falls, in the county of Rensselaer and State of New York, have invented certain new and useful improvements in the connection between the chain and rake of an automatic-rake reaping-machine to prevent the straw or grass from winding around the rake-pin; and I do hereby declare the following to be a full, clear, and exact description of the same, reference being had to the accompanying drawing making a part of this specification, in which—

Figure 1:
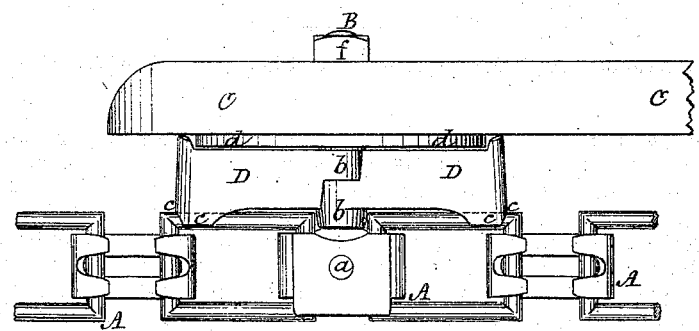
Figure 2:
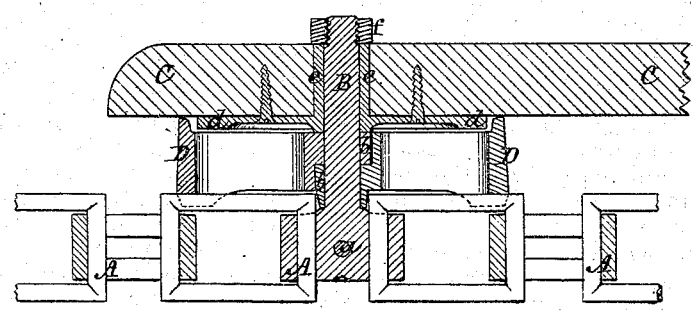
Figure 3:
Figure 4:
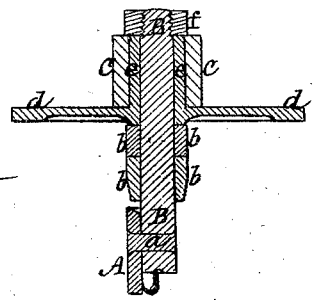

Figure 1 represents, in elevation, a portion of a chain and of a rake with the connection in question uniting them. Fig. 2 represents a vertical longitudinal section through the same. Fig. 3 represents a horizontal sectional view taken below the rake and rake-plate. Fig. 4 represents a vertical transverse section through the mechanism, as shown in the several figures.

Similar letters of reference where they occur in the several separate figures denote like parts of the mechanism in the drawing.

The object and purpose of this invention are to prevent, in reaper-rakes that are driven by a chain, the winding of straw or grass around the rake-pin.

To enable others skilled in the art to make and use my invention, I will proceed to describe the same with reference to the drawing.

A represents the links of chain, which may be driven in the usual well-known way, on and by the gears of a reaping-machine, and to one of these links, or a special link in the chain, as at $a$, there is fastened, by riveting or otherwise, a rake-pin, B, which, at or near its upper end, carries the rake, rake-stale, or handle C, to which the rake may be attached in any well-known way. On the rake-pin B, above the chain, are arms or shields D, which have hubs $b\ b$ upon them, through which the rake-pin passes, and on or by which they may turn, and their outer ends are recessed and flanged, as at $c$, so as to ride upon the links of the chain. The rake-stale or handle C has secured to its under side a plate, $d$, that has a a boss, hub, or sleeve, $e$, upon it, extending through, or partially so, the said handle. The rake-pin B passes through this sleeve, boss, or hub $e$, and is secured thereto or to the plate $d$ by a nut, $f$, on its upper end. The arms or shields D, for the sake of lightness, may be cast with openings $g$ through them.

It will be perceived that while the chain is free in its flexure, so as to follow its path over or around the chain driving-wheels, the rake is also free to follow its path over or around the platform or grain-table, and yet the rake-pin is always shielded or protected so that straw or grass cannot wind around it and impede or stop the motion of said rake.

Having thus fully described my invention, what I claim therein as new, and desire to secure by Letters Patent, is—

In combination with the chain and a rake driven thereby, the rake-pin B and arms or shields D hinged thereto and riding on a chain, for the purpose of preventing straw or grass from winding on said rake-pin, substantially as described.

JOHN M. ROSEBROOK.

Witnesses:
 J. RUSSELL PARSONS,
 A. C. GEER.